United States Patent [19]
Johnson

[11] 3,772,585
[45] Nov. 13, 1973

[54] CAPACITY COMPENSATION AND DISCRIMINATION CIRCUITS FOR HIGH VOLTAGE POWER SUPPLY

[75] Inventor: Lambert L. Johnson, Fort Wayne, Ind.

[73] Assignee: General Electric Company, Indianapolis, Ind.

[22] Filed: Feb. 28, 1973

[21] Appl. No.: 336,464

[52] U.S. Cl.................... 323/7, 317/262 A, 323/61, 323/74
[51] Int. Cl.......................... G03g 15/00, G05f 1/14
[58] Field of Search..................... 317/262 A; 323/6, 323/7, 8, 44 R, 48, 61, 62, 74, 76, 77, 81, 122, 125

[56] References Cited
UNITED STATES PATENTS
2,858,406  10/1958  Boyd et al.......................... 323/76 X
3,601,718  8/1971  Arnesen............................ 323/77 X Primary Examiner—A. D. Pellinen
Attorney—Radford M. Reams et al.

[57] ABSTRACT

A high voltage power supply having regulated resistive current. The power supply is in an environment for drawing both resistive and capacitive currents. It is desired to regulate the resistive current only and to cancel out and/or discriminate against the capacitive current. The power supply utilizes a novel capacitive compensation network which adds a voltage of an equal magnitude but in an opposite phase relationship to the voltage due to the capacitive current through the power supply. This circuit is effective for cancelling out capacitive currents for certain relatively low frequency ranges. A phase discriminator is further provided to operate in conjunction with the capacitive compensation circuit in order to pass only the resistive component of current to a control circuit for resistive current regulation. The effect of the capacitive current is thus cancelled and discriminated against by combining the capacitive compensation network with the phase discrimination network and effective regulation is obtained for higher frequencies.

6 Claims, 5 Drawing Figures

CAPACITY COMPENSATION AND DISCRIMINATION CIRCUITS FOR HIGH VOLTAGE POWER SUPPLY

BACKGROUND OF THE INVENTION

This invention relates to power supplies having regulated resistive load outputs. More particularly it relates to power supplies having means for cancelling and/or discriminating against capacitive currents and for regulating the resistive current only.

In the field of power supply regulation it is often desired to regulate a certain component of the current. In many applications, such as power supplies for electrostatic copy machines, there exists a resistive current known as the corona current which is used to charge the electrostatic surface in the copy machine. There is also capacitive current which is drawn by load capacitance and stray capacitance. The load device used to charge the electrostatic surface in the copy machine often includes a thin wire partially surrounded by a shield with an air gap between the wire and the shield. There is also a cable connected between the power supply output and the load device. The wire and the cable cause a load capacitance which will draw capacitive current from the power supply. Furthermore, there is stray capacitance within the power supply which causes more capacitive current. It is desired to regulate the resistive current, that is, the current which flows through the thin wire in the load device.

Regulation of power supplies, in general, is accomplished by a feedback circuit or control circuit connected from the output of the power supply to the input. The output voltage or current is sensed by sensing the voltage drop across a resistance and is fed back to a control circuit. However, in many alternating current applications, the capacitive current may become high, whereas the resistive current required for the electrostatic process may be low so that regulation in the conventional manner becomes all but impossible. It is, therefore, desired to find a means to regulate the resistive component of current without interference by capacitive current.

SUMMARY OF THE INVENTION

Accordingly, one of the objects of the invention is to provide a power supply which has resistive and capacitive components of load current wherein the resistive component alone is regulated.

Another object is to utilize a phase discriminator and a capacitive compensation circuit in a power supply having resistive and capacitive currents so that the capacitive currents do not substantially interfere with the regulation of the resistive current.

Another object is to provide a high voltage, low current output regulated power supply wherein resistive current is regulated and the capacitive current is discriminated against and/or cancelled.

Another object of the invention is to provide a power supply having an improved capacitive compensation network wherein the capacity component of the output current is effectively cancelled.

A regulated power supply is provided having a resistive load and a capacitive load. The power supply has the ability to stabilize resistive current and includes a transformer having a primary and at least one secondary winding. A capacity compensation circuit is connected to the transformer secondary winding. The capacity compensation circuit is used to effectively cancel out currents which are caused by the capacitive load and stray capacitance. The compensation circuit may be connected to a control circuit or feedback regulator. A variable impedance may be used in conjunction with a capacitance in the capacity compensation circuit to compensate for various load and stray capacitance values. A phase detector may be connected to a reference secondary winding of the transformer to discriminate against the capacitive component of current in the power supply. This phase detector would allow only the resistive current, which is in-phase with the reference secondary voltage, to be fed back to the control circuit for regulation. By combining the capacity compensation circuit, which will effectively cancel out most of the capacitance component of the output current, with the phase detector, which will feed back only resistive or in-phase currents through the control circuit, excellent regulation of resistive current may be achieved.

BRIEF DESCRIPTION OF THE DRAWINGS

The subject matter which is regarded as the invention is set forth in the appended claims, the invention itself together with further objects and advantages thereof may be better understood by reference to the following description taken in conjunction with the accompanying drawings in which:

DESCRIPTION OF THE PREFERRED EMBODIMENTS

Figure 1:
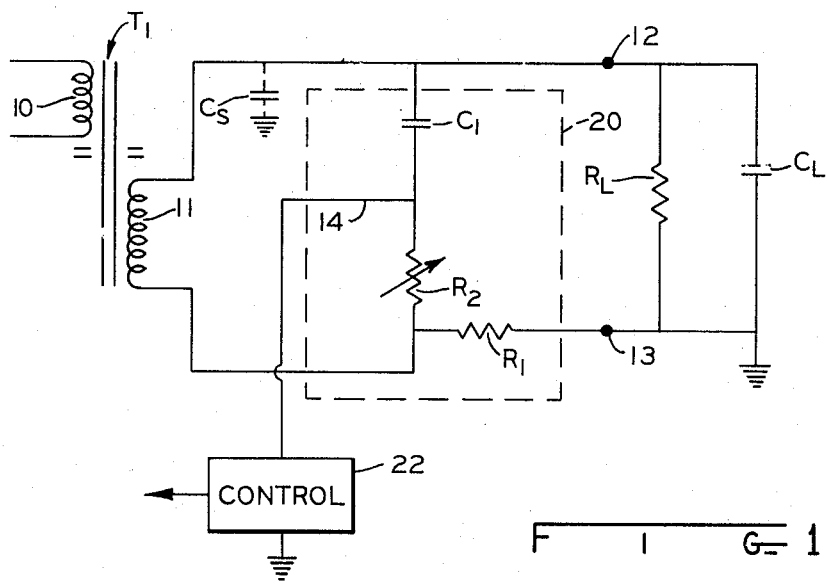
FIG. 1 is a schematic circuit diagram of one embodiment of the invention incorporating a capacity compensation circuit.

Referring now more particularly to FIG. 1 there is provided transformer $T_1$ having primary winding 10 and secondary winding 11 mounted on a common core and being loosely coupled. Primary winding 10 may be connected to a source of AC power. Secondary winding 11 steps up the voltage from the primary winding. Capacitance $C_S$ represents the stray capacitance in the power supply and is shown connected with respect to ground potential. Resistance $R_L$ is the load resistance. The current through this load resistance is that which is desired to be regulated. Load resistance $R_L$ may be a thin wire in an electrostatic copy machine and the current through it is known as corona current. Capacitance $C_L$, which is indicated across load resistance $R_L$, is the load capacitance to ground. This capacitance may represent the capacitance of the thin wire in the electrostatic charging load, and also of a cable connected between the power supply and the thin wire in the electrostatic copy device. The circuit as indicated in block 20 is the capacity compensation circuit. This circuit is used to cancel the effect of the capacitive current, drawn by capacitance $C_S$ and $C_L$, on control circuit 22. Capacitor $C_1$ is usually selected to be approximately equal to the estimated total capacitance $C_S$ plus $C_L$ in the circuit. Resistor $R_1$, which is connected between the load resistance $R_L$ and secondary winding 11, is the current sensing resistor and senses capacitive and resistive current components. Resistor $R_2$ is a variable resistor connected between capacitor $C_1$ and sening resistor $R_1$. Resistor $R_2$ is used to adjust the total impedance of the capacity compensation circuit so that feedback lead 14 is substantially free from capacitive current effects. Normally one would attempt to make $R_1 = R_2$, assuming that the $C_1 = C_L + C_S$. However, if the capacitance of capacitor $C_1$ is not exactly equal to the total stray and load capacitance of the circuit, the impedance may be adjusted so that the magnitude of the voltage drop due to the capacity compensation circuit is nearly equal and opposite with respect to ground, to the voltage drop across sensing resistor $R_1$ due to $C_L + C_S$. Feedback lead 14 is connected between capacitor $C_1$ and variable resistor $R_2$ and to control circuit 22. Control circuit 22 may be a well known current regulator and is connected to ground.

In operation, a current from secondary winding 11 will flow through resistor $R_L$, and capacitances $C_L$ and $C_S$, through current sensing resistor $R_1$, and back to secondary winding 11. Current also flows through compensation capacitor $C_1$ and variable resistor $R_2$. In this embodiment the impedance of $C_1$ is much greater than $R_2$, therefore, the current through $C_1$ and $R_2$ is almost all capacitive. The voltage drop across variable resistor $R_2$ is approximately equal to the voltage drop across resistor $R_1$ due to capacitive current, however, they are opposite to one another with respect to ground. The voltages due to capacitive current, therefore, effectively buck one another. The voltage across resistor $R_1$ due to resistive current, however, is applied at lead 14 and feedback to the control circuit 22. The resistive or corona current is thus regulated with the effects of the load and stray capacitance cancelled.

Figure 2:
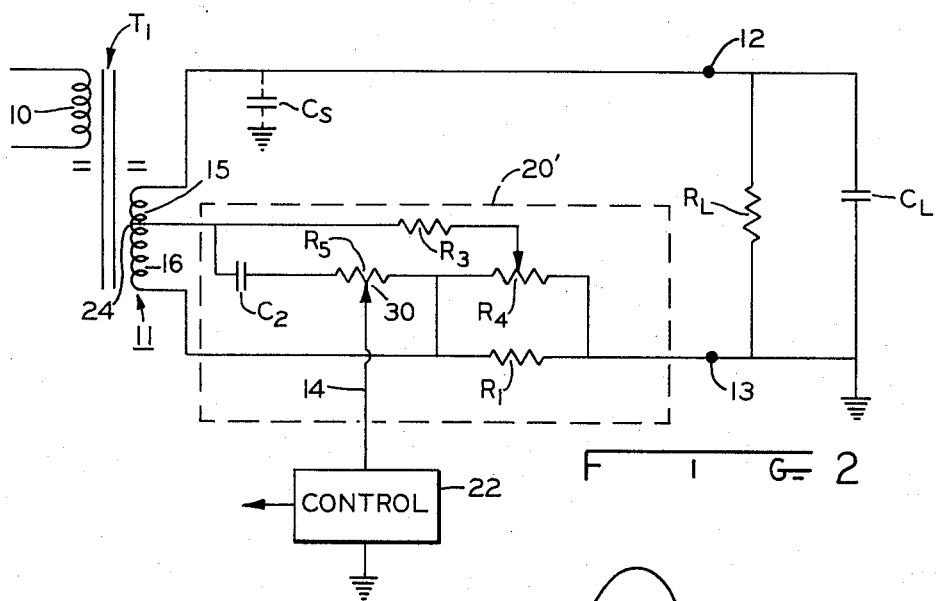
FIG. 2 is a schematic circuit diagram of another embodiment of the invention utilizing another form of the capacity compensation circuit.

The circuit in FIG. 2 is similar to that in FIG. 1 except that a capacitive compensation circuit 20 is different. Secondary winding 11 of transformer $T_1$ is tapped at 24 and thus divided into sections 15 and 16 which are connected to the compensation circuit. Compensation circuit 20 includes compensation capacitor $C_2$ which is connected to the secondary winding 11 at a tap 24 where secondary winding 11 is split. By connecting it to a tap in the secondary winding the voltage requirement of the capacitor is lessened because of the reduced voltage across winding 16. The capacitance of the compensation capcitor must be increased, however, in order to cancel the effect of the stray and load capacitance since they are across higher voltages. The net result is a lower cost for the compensation capacitor. Potentiometer $R_5$, which is analogous to impedance compensation resistor $R_2$, is connected between capacitor $C_2$ and sensing resistor $R_1$. Capacitor $C_2$ is not so much larger than $R_5$ as capacitor $C_1$ is larger than $R_2$. Therefore, phase correction resistor $R_3$ and potentiometer $R_4$ are necessary to make the current through capacitor $C_2$ and resistor $R_5$ more purely capacitive. Potentiometer $R_4$ is connected across sensing resistor $R_1$ and its tap is connected to resistor $R_3$. This allows the phase correction resistor $R_3$ to be effectively variable. Resistor $R_3$ also serves to compensate for a resistive component of impedance in capacitor $C_2$. The tap 30 of potentiometer $R_5$ is connected to the control feedback circuit 22, again to feedback only the resistive components of the power supply load current such that only the resistive component is regulated.

The circuits shown in FIGS. 1 and 2 are especially useful at low input frequencies, e.g., 60 Hz because at low frequencies capacitances $C_L$ and $C_S$ are high impedances and, therefore, draw low currents. Changes in capacitances, such as by moving a cable, will not affect the voltage on feedback lead 14 very much.

Figure 3:
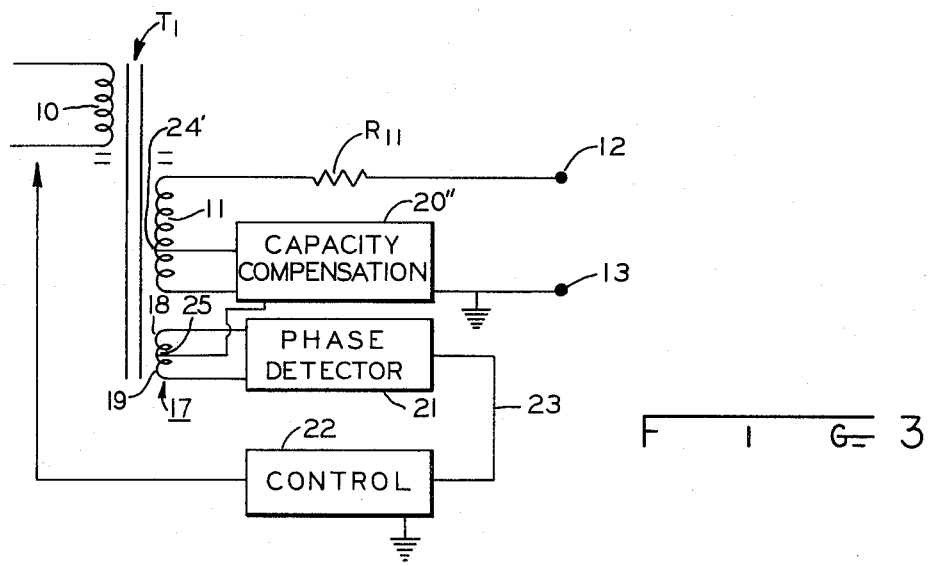
FIG. 3 is a schematic circuit diagram in partial block form showing the utilization of a capacity compensation circuit and a phase detection circuit for providing regulated resistive output current.

The circuit in FIG. 3 shows a capacity compensation circuit connected in a similar manner as in FIG. 1 or FIG. 2, however, in FIG. 3 there is also shown phase detector 21 connected to capacity compensation circuit 20'' and is used to discriminate against capacitive currents and to feedback only resistive currents to the control circuit.

Figure 4:
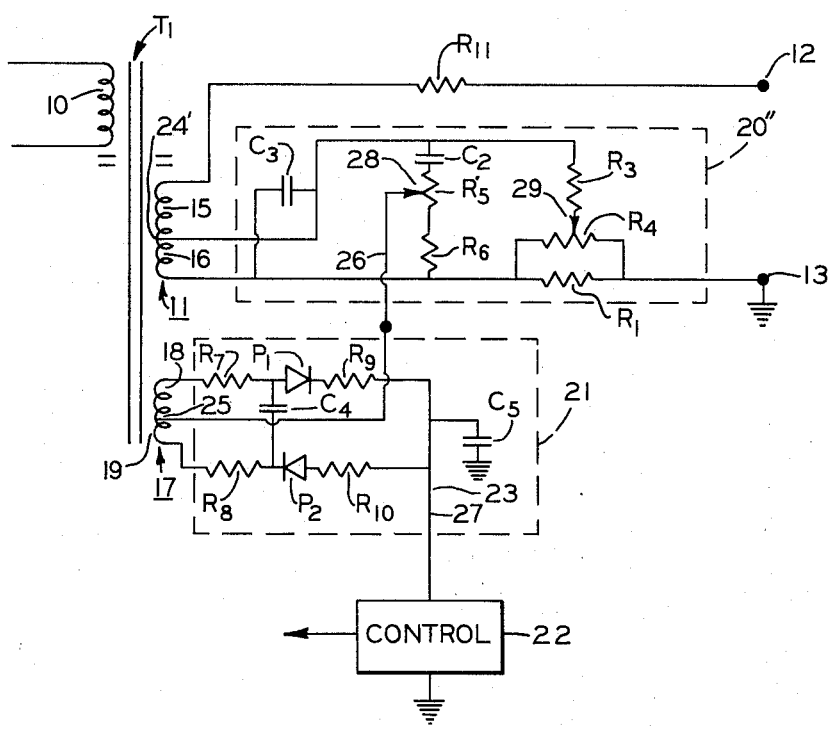
FIG. 4 is a schematic circuit diagram showing one form, in more detail, of the capacity compensation circuit and phase detection circuit as shown in FIG. 3.

The circuit of FIG. 3 is useful at high input frequencies, e.g., 600 Hz, because at these frequencies capacitances $C_L$ and $C_S$ will draw larger currents and changes in capacitances may not be compensated for by using the capacity compensation circuit alone. The capacitance changes may occur after the impedance compensation resistor is adjusted. A more detailed circuit diagram of one embodiment of the capacitive compensation circuit and the phase detector circuit is shown in FIG. 4. The capacitive compensation circuit 20'' is shown connected to tap 24' of secondary winding 11 of transformer $T_1$. The capacitive compensation circuit of FIG. 4 is similar to that of FIG. 2. Tuning capacitor $C_3$ is connected across the lower portion secondary winding 11 denoted as 16 and forms a resonant circuit with the inductance of transformer $T_1$ in order to increase secondary voltage. In this embodiment resistor $R_5'$ is not connected directly to the control feedback regulation circuit as was described in FIG. 2, however, it is connected to secondary reference winding 17 at tap 25. Secondary reference winding 17 is connected to phase detection circuit 21 to provide a reference voltage. Secondary winding 17 is loosely coupled to primary winding 10 and tightly coupled to secondary winding 11 and is split by center tap 25. The phase detector includes resistors $R_7$ and $R_8$ connected to capacitor $C_4$ to form a phase correction network. Diodes $P_1$ and $P_2$ are connected respectively to resistors $R_7$ and $R_8$ and poled for conducting during the half cycle when point 18 is positive and point 19 is negative. Resistors $R_9$ and $R_{10}$ are connected to the other sides of diodes $P_1$ and $P_2$ respectively. These resistors $R_9$ and $R_{10}$ are approximately equal in value and are connected in common into a control feedback regulation network 22. Integration capacitor $C_5$ is also connected to resistors $R_9$ and $R_{10}$. This phase detector will pass to the control circuit 22 only the current component, on lead 26, which is in-phase with the reference voltage.

Figure 5:
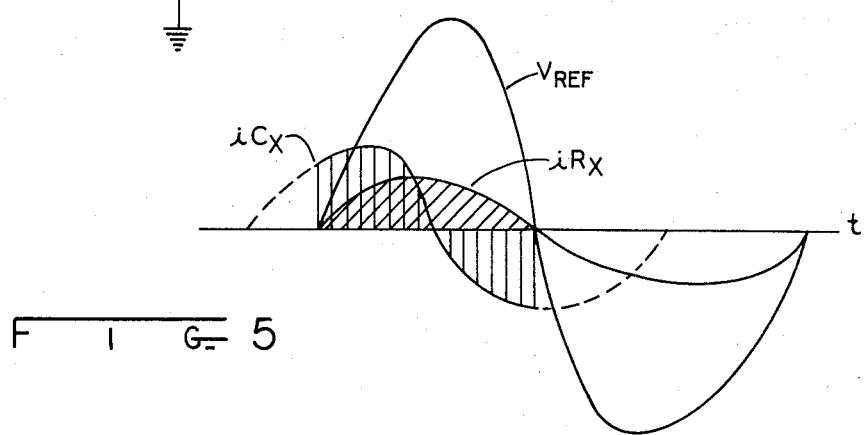
FIG. 5 is a diagram of waveforms showing resistive and capacitive current components and a reference voltage utilizing the phase detector shown in FIG. 4.

The phase detector will be better understood by reference to the waveforms as shown in FIG. 5. FIG. 5 shows V ref. as the reference voltage across secondary reference winding 17. Diodes $P_1$ and $P_2$ will conduct, in this embodiment, only when this voltage is positive at point 18. The components of current which may be present on lead 26, including any capacitive current which may have escaped cancellation by the capacity compensation circuit 20, is indicated as $i_{CX}$ and $i_{RX}$. Currents $i_{CX}$ and $i_{RX}$ conduct only while diodes $P_1$ and $P_2$ are forward biased. When diodes $P_1$ and $P_2$ are not conducting there may be voltages due to resistive currents and capacitor currents present on lead 26. This current is received at the center tap of winding 17 and is drawn through diodes $P_1$ and $P_2$ during the positive half cycle of V ref. This current is integrated by capacitor $C_5$ in conjunction with resistors $R_9$ and $R_{10}$. The integration is indicated by the shading under and above the $i_{CX}$ and $i_{RX}$ curves which includes the time period in which V ref. is positive. As can be seen, the resistive component $i_{RX}$ conducts for its entire positive half cycle and for the entire positive half cycle of V ref. This happens because resistive current is in-phase with the secondary reference voltage. The resistive conduction is shown by the angle type of shading. The capacitive current $i_{CX}$ leads the secondary voltage by approximately 90°. It is also integrated by capacitor $C_5$ but its effect is nulified because the capacitive current conducts equally and oppositely during the reference voltage half cycle as shown by the vertical shading. That is, the positive integration under $i_{CX}$ is approximately equal to the negative integration above $i_{CX}$. There is substantially no current integrated due to voltage V ref. induced into the reference winding 17. Equal voltages will appear from point 18 to center tap 25 and from center tap 25 to point 19. The center tap is effectively grounded at point 13. When a positive voltage appears across winding 17 integration capacitor $C_5$ changes positive on its ungrounded side due to the positive voltage at point 18 and negative on its ungrounded side due to the negative voltage at point 19. Since the transformer is center-tapped grounded (approximately) the charge will be equal and opposite.

The compensation circuit and the phase detector work together to provide feedback of the resistive component only to the control circuit by the cancellation and phase discrimination of the effects capacitive current components which may exist internally in the circuit or as load capacitances.

Various other types of phase discrimination or detector circuits may be used to get rid of the capacitive component in the power supply. The phase detector is needed in conjunction with the capacity compensation circuit because very low current levels are often required in electrostatic copy devices. A small change in load capacitance can upset the circuit so greatly that the capacity compensation circuit alone will not work well to cancel out all of the capacitive component. This is because at high frequencies (e.g. 600 Hz) the impedance of sensing resistor $R_1$ may become large as compared to capacitance impedance. A small change in load capacitiance, e.g. the cable moving with respect to ground, will cause relatively large current changes. Each change in capacitance would have to be compensated for by adjusting resistor $R_1$ shown in FIG. 1. This would prove cumbersome.

The phase discriminator will not work well alone at high or low frequencies because if the capacitive voltage on lead 26 is large it may become a large factor in tuning on diodes $P_1$ and $P_2$. These diodes would then come on before the reference voltage, V ref. goes positive. Some capacitive currents may then be integrated and capacitive current effects would be felt at the control circuit 22.

In operation of FIG. 4, an AC input is received across primary winding 10 of transformer $T_1$. This voltage is stepped up across secondary winding 11. The output is indicated at output terminals across 12 and 13 as the current flows through surge resistor $R_{11}$. Part of the voltage is impressed across the winding section 16 and a current flows through capacitor $C_2$, resistors $R_5$ and $R_6$ and back to the other side of winding section 16. Current also flows through resistor $R_3$ and through the tap of $R_4$ which is connected across sensing resistor $R_1$. Sensing resistor $R_1$ will carry the total load current of the supply including the capacitive current due to load capacitance and stray capacitance and the resistive current due to the load resistance. At least part of the effect of capacitive component of the load current will be cancelled out by use of capacity compensation circuit 20''. Capacitor $C_2$ is proportional to the total load and stray capacitance. The voltage drop from tap 28 of potentiometer $R_5'$ across resistor $R_6$ is approximately equal to the voltage drop due to capacitance current across resistor $R_1$. These two voltages are opposed to one another with respect to ground and should cancel, leaving only a voltage due to resistive current on lead 26. However, because the load and stray capacitance may change after potentiometer $R_5'$ has been adjusted, some amount of capacitive voltage may be present on lead 26. Because of this winding 17 is further connected to lead 26 which supplies a voltage having capacitive components, which were not cancelled by the capacitive compensation circuit, and the resistive component. Phase detector 21 operates, as previously described in the discussion of the waveforms in FIG. 5 to discriminate against these other capacitive components present on lead 26, and to pass only the resistive component to control regulator 22.

A circuit as set forth in FIG. 4 has been built and operated with the following set of values:

Resistor $R_1$ - 15K ohms
$R_3$ - 12M ohms
$R_4$ - 50K ohms
$R_5$ - 15K ohms
$R_6$ - 4.7K ohms
$R_7$ - 33 ohms
$R_8$ - 33 ohms
$R_9$ - 100K ohms
$R_{10}$ - 100K ohms
$R_{11}$ - 75K ohms
Capacitor $C_2$ - 220 pf
$C_3$ - 0 to 47 pf
$C_4$ - 0.1 uf
$C_5$ - 0.47 uf
Transformer $T_1$
  primary winding 10 - 208 turns
  secondary winding 11 - 20,000 turns, tap at 4130 turns
  secondary winding 17 - 320 turns, center tapped From the foregoing description of the embodiments of the invention it will be apparent that many modifications may be made therein. It will be understood, however, that these embodiments of the invention are intended as exemplification of the invention only and that the invention is not limited thereto: For example other types of phase discriminators may be used in place of the phase discriminator described in FIG. 4. It will be understood, therefore, that it is intended in the appended claims to cover all modifications that fall within the true spirit and scope of the invention.

What I claim as new and desire to secure by letters Patent of the United States is:

1. A power supply circuit having resistive and capacitive current components comprising:

a transformer having primary and secondary windings; feedback means for connecting said circuit to a regulator control; a capacity compensation means connected to said secondary winding and to said feedback means for substantially cancelling the effect of capacitive current but retaining the effect of resistive current on said feedback means; means for varying the impedance of said capacity compensation means connected to said feedback means, whereby resistive current is adapted to be regulated.

2. A power supply circuit as set forth in claim 1 wherein said capacity compensation circuit includes a capacitance; said means for varying the impedance includes a variable resistance; said capacitance and said variable resistance being connected in a series relation and further across at least part of said secondary winding.

3. A power supply circuit as set forth in claim 2 wherein said capacity compensation means further includes a sensing means for sensing the total load current through the power supply, the voltage drop across said sensing means being equal and opposite to the voltage drop across said variable resistance.

4. A power supply as set forth in claim 1 further including a tap connected to said secondary winding, said capacity compensation means being connected between one side of said secondary winding and said tap.

5. A power supply having resistive and capacitive current components adapted for use with a regulation feedback circuit comprising:

an input transformer having a primary and at least a first secondary winding; a capacity compensation circuit connected to said first secondary winding of said input transformer for substantially cancelling the effect of capacitive current in said compensation circuit; phase detector connected to said capacity compensation circuit and to a regulated feedback control circuit for discrimination against capaitive current, whereby the resistive current is adapted to be regulated.

6. A power supply as set forth in claim 5 wherein said phase detector includes, a secondary winding magneticly coupled to said first secondary winding for establishing a reference voltage, a first rectifier connected to one side of said second secondary winding and a second rectifier connected to the other side of said second secondary winding, said rectifiers poled to conduct only during one polarity of the reference voltage, a capacitance connected to the anode of said first rectifier and to the cathode of said second rectifier for integrating the current in said phase detector, whereby the voltage due to capacitive current is discriminated against and the only voltage due to resistive current is fed back for regulation.

* * * * *